United States Patent [19]

Nugent

[11] Patent Number: 5,175,733
[45] Date of Patent: Dec. 29, 1992

[54] ADAPTIVE MESSAGE ROUTING FOR MULTI-DIMENSIONAL NETWORKS

[75] Inventor: Steven F. Nugent, Portland, Oreg.

[73] Assignee: Intel Corporation, Santa Clara, Calif.

[21] Appl. No.: 634,415

[22] Filed: Dec. 27, 1990

[51] Int. Cl.$^5$ .............................................. H04J 3/24
[52] U.S. Cl. .................................... 370/94.3; 370/60; 370/54
[58] Field of Search ....................... 370/94.3, 61, 60.1, 370/60, 54, 16; 379/219, 220, 221, 271, 272, 273; 340/826, 827

[56] References Cited

U.S. PATENT DOCUMENTS

4,598,400  7/1986  Hillis ................................. 370/94.1
4,731,825  3/1988  Wojcinski et al. ................. 379/273
5,040,173  8/1991  Richards ............................. 370/54

Primary Examiner—Douglas W. Olms
Assistant Examiner—Shick Hom
Attorney, Agent, or Firm—Blakely, Sokoloff, Taylor & Zafman

[57] ABSTRACT

An adaptive routing means and method useful for transferring messages on a number of multi-dimensional network topologies that connect distributed multi-processing systems. A plurality of processing nodes comprising processing means for processing information and router means for routing messages are connected in a multi-dimensional network (A) with an identical or redundant message passing multi-dimensional network (B) of routers being connected to network A. Each router comprises four types of channels for message passing: 1) a channel to transfer information between a router and a processor coupled to the router, 2) a channel to transfer information in an X direction, 3) a channel for the Y direction, and 4) a channel for the Z direction. This connectivity allows messages to pass between nodes within network A, between routers within network B, or between network A and network B by passing through a router. Messages are routed in networks A and B by routing first in the X dimension and then in the Y dimension. The present invention transitions between A and B networks when contention is encountered in the X or Y direction, if the appropriate Z channel is available. If an X or Y channel is not immediately granted, a request is made for the Z channel. Both the request for an X or Y channel and the request for the Z channel are maintained until one request is granted. The message is then routed on the granted channel and the other request is withdrawn. The router does not commit to routing on a particular channel until one channel is available.

24 Claims, 10 Drawing Sheets

ADAPTIVE MESSAGE ROUTING FOR MULTI-DIMENSIONAL NETWORKS

FIELD OF THE INVENTION

The present invention pertains to the field of multi-dimensional computer networks. Specifically, the present invention pertains to adaptive message routing in multi-dimensional network topologies.

BACKGROUND OF THE INVENTION

A number of parallel processing computer systems and message routing techniques are well known in the prior art. Generally, in such parallel processing systems, a large number of processors are interconnected in a network. In such networks each of the processors may execute instructions in parallel and may transfer messages to other processors in the network.

U.S. Pat. No. 4,598,400, invented by Hillis, describes an n-dimensional parallel processing computer system in which an array of nodes are interconnected in a pattern of two or more dimensions. Communication between the nodes is directed by addresses indicating displacement of the nodes. Hillis specifically discloses a system in which a message packet may be routed from one node to another in an n-dimensional network. The message packet comprises relative address information and information to be communicated between the nodes.

Many known parallel processing computer systems utilize a store-and-forward mechanism for communicating messages from one node to another. The Hillis system describes such a store-and-forward mechanism. Such store-and-forward mechanisms are more clearly described in Parviz Kermani and Leonard Kleinrock, *Virtual Cut-Through: A new Computer Communication Switching Technique*, Computer Networks, Vol. 3, 1979, pp. 267-286. Kermani et al. distinguishes store-and-forward systems from circuit switching systems. Specifically, a circuit switching system is described as a system in which a complete route for communication between two nodes is set up before communication begins. The communication route is then tied up during the entire period of communication between the two nodes. In store-and-forward (or message) switching systems, messages are routed to a destination node without establishing a route beforehand. In such systems, the route is established dynamically during communication of the message, generally based on address information in the message. Generally, messages are stored at intermediate nodes before being forwarded to a selected next node. Kermani et al. further discusses the idea of packet switching systems. A packet switching system recognizes improved utilization of resources and reduction of network delay may be realized in some network systems by dividing a message into smaller units termed packets. In such systems, each packet (instead of message) carries its own addressing information.

Kermani et al. observes that extra delay is incurred in known systems because a message (or packet) is not permitted to be transmitted from one node to the next before the message is completely received. Therefore, Kermani et al. discloses an idea termed "virtual cut-through" for establishing a communication route. The virtual cut-through system is a hybrid of circuit switching and packet switching techniques in which a message may begin transmission on an outgoing channel upon receipt of routing information in the message packet and selection of an outgoing channel. This system leads to throughput times exactly the same as in a store-and-forward system when all intermediate channels are busy. When all intermediate nodes are idle, this system leads to throughput times similar to a circuit switched system. However, the system disclosed by Kermani et al. still requires sufficient buffering to allow an entire message to be stored at each node when all channels are busy.

W. J. Dally, *A VLSI Architecture for Concurrent Data Structures*, Ph.D Thesis, Department of Computer Science, California Institute of Technology, Technical Report 5209, March 1986, discusses a message-passing concurrent architecture to achieve a reduced message passing latency. In Chapter 3, Dally discusses a balanced binary n-cube architecture.

In Chapter 5, Dally discusses an application for reducing message latency. In general, Dally discloses use of a wormhole routing method, rather than a store-and-forward method. A wormhole routing method is characterized by a node beginning to forward each byte of a message to the next node as the bytes of the message arrive, rather than waiting for the next arrival of the entire packet before beginning transmission to the next node. Wormhole routing thus results in message latency, which is the sum of two terms, one of which depends on the message length L and the other of which depends on the number of communication channels traversed D. Store-and-forward routing yields latency depending upon the product of L and D. (See Dally at page 153).

A further advantage of a wormhole routing method is that communications do not use up the available memory of intermediate nodes. In the Dally system, packets do not interact with the processor or memory of intermediate nodes along the route, but rather remain strictly within a routing chip network until they reach their destination.

Dally at pages 154-157 further discloses a message packet comprising relative X and Y address fields, a variable size data field comprising a plurality of non-zero data bytes and a tail byte.

The wormhole routing method alone does not guarantee a deadlock-free routing system. The $e^3$ algorithm discussed in Dally provides a deadlock-free routing; however, Dally does not provide an adaptive routing system.

Researchers have been motivated to develop adaptive routing techniques in order to alleviate the congestion that is characteristic in heavily loaded multi-dimensional networks and to make more efficient use of channels between nodes. Adaptive routing can also exploit the multiplicity of processors to achieve some level of fault-tolerance in multiprocessor or parallel processing computer systems. These adaptive routing techniques allow messages to dynamically take alternate routes when busy or inoperative channels are encountered; however, message packet buffers are typically required in the intermediate routing elements in order to avoid both deadlock and livelock. These buffers add considerably to the complexity of the implementations and can add significantly to the latency of the routing systems even in the absence of congestion. The adaptive routing technique of the present invention is proven both deadlock and livelock free without the need for packet buffering in the intermediate routing elements.

It is therefore an objective of the present invention to develop an improved method of communication between nodes in a multi-dimensional network.

As another it is desired to develop a parallel processing computer system having reduced message passing latency.

As another object of the present invention, it is desired to develop a system which efficiently and adaptively passes messages without requiring buffering of message packets at each node.

SUMMARY OF THE INVENTION

The present invention provides a means and method for implementing an adaptive routing technique on a number of multi-dimensional network topologies that connect distributed multiprocessing systems. In the preferred embodiment of the present invention, a first multi-dimensional routing network, denoted A, comprising a plurality of processing nodes is described. Each node comprises a processing means for processing information and a router means for routing information (i.e. messages) between nodes in the network. In order to improve the efficiency of the message passing arrangement in network A, a second multi-dimensional routing network, denoted B, of routers is connected to network A. Networks A and B are of equal topology and dimension. In the preferred embodiment, each router has an X coordinate and a Y coordinate in its respective network. The router at particular coordinates in network A is connected to the router at the corresponding coordinates in network B via channels denoted Z channels.

In the preferred embodiment of the present invention, networks A and B are arranged as a two-dimensional dual mesh connection of nodes. Each node includes a router which comprises four types of channels for communication of information. A first channel is utilized to transfer information between a router and a processor coupled to the router. A second channel is used to transfer information between routers in an X direction. A third channel is used to transfer information between routers in a Y direction. A fourth channel is used to transfer information between routers in a Z direction.

Two cases of Z channel connectivity can occur depending on whether the message being routed includes complete addressing information or incomplete addressing information. For a message with complete addressing, the address information passed to the redundant network completely indicates the extent to which the message has traversed the route. In the case of absolute addressing, this complete address information implies the extent to which the message has traversed the route. For a message with incomplete addressing, insufficient information is passed with the message to the redundant network in order to determine the extent to which the message has traversed the route.

If complete or absolute message addressing is used, each router has an input and an output Z channel that connects to a redundant network. In the case of incomplete addressing, two outgoing and two incoming Z channels, one pair for X routing and the other for Y routing, connect to a redundant network.

This connectivity allows messages to pass between nodes within network A, between routers within network B, or between network A and network B by passing through a router. The router accepts address information from the processing means and communicates the address information from node-to-node to establish a communication route for information from an origin node to a destination node. The message includes addressing information and data. At the completion of communication of information, the route is released and channels used by the route are made available for communication between other nodes.

Messages are routed in networks A and B using routing information contained in each message by routing first in the X dimension and then in the Y dimension similar to prior art routing methods. As in prior art routing, the path between any two nodes in the X and Y dimensions is unique. Unlike the prior art, however, the present invention transitions between networks when unavailable channels are encountered in the X or Y direction, if the appropriate "Z" channel is available. Unavailable channels are those that are busy, non-existent, or malfunctioning. Therefore, in the present invention, the routing information contained in the message is used only for purposes of defining the unique route in the X and Y dimensions. Routing in the Z dimension is variable and dependent on the unavailable channels encountered in the networks.

During a message transfer in the X and Y dimensions, if a channel is not immediately granted, a request is made for the Z channel. Both the request for an X or Y channel and the request for the Z channel are maintained until one request is granted. The message is then routed on the granted channel and the other request is withdrawn. If the requested (X or Y) channel and the requested "Z" channel are both busy, the message is blocked and is not routed on the "Z" channel. The router does not "commit" to routing on a channel until one is available. The normal routing address header is not altered by the transition through the Z dimension. When the message arrives at the destination router, the message is provided to the destination processor by its associated router. This adaptive routing technique requires that the router examine the routing address to determine whether the message has arrived at the destination node. This examination is performed each time the message transits the Z dimension. If a transition from a first network to a second network takes place and all desired channels of the second network are unavailable, the message will be blocked and will not route back to the first network on a Z channel.

DETAILED DESCRIPTION OF THE PREFERRED EMBODIMENT

The present invention provides a means and a method for adaptively routing messages in a multi-dimensional computer network. In the following description, numerous specific details are set forth in order to provide a thorough understanding of the invention. However, it will be apparent to one with ordinary skill in the art that these specific details need not be used to practice the present invention. In other instances, well-known structures, circuits, and network protocols have not been shown in detail in order not to unnecessarily obscure the present invention.

Figure 1:
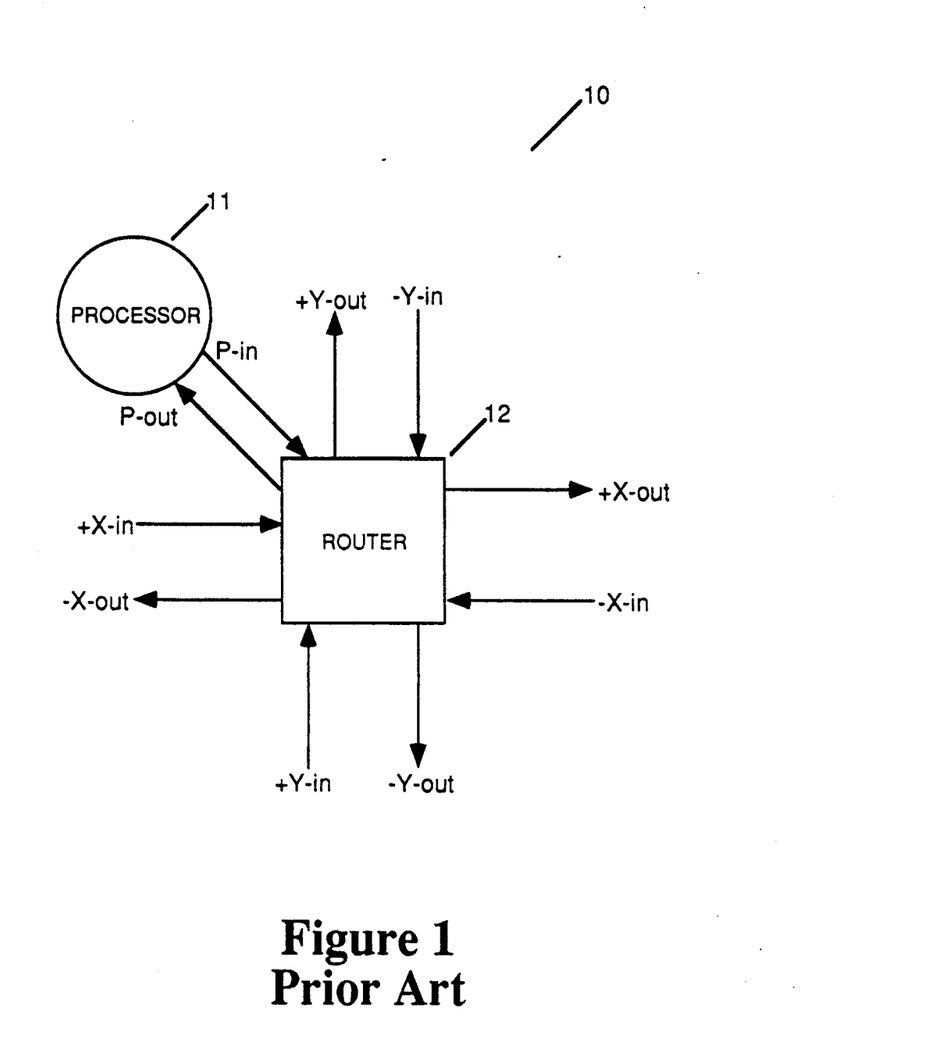
FIG. 1 is an illustration of a node in prior art networks.
Figure 2:
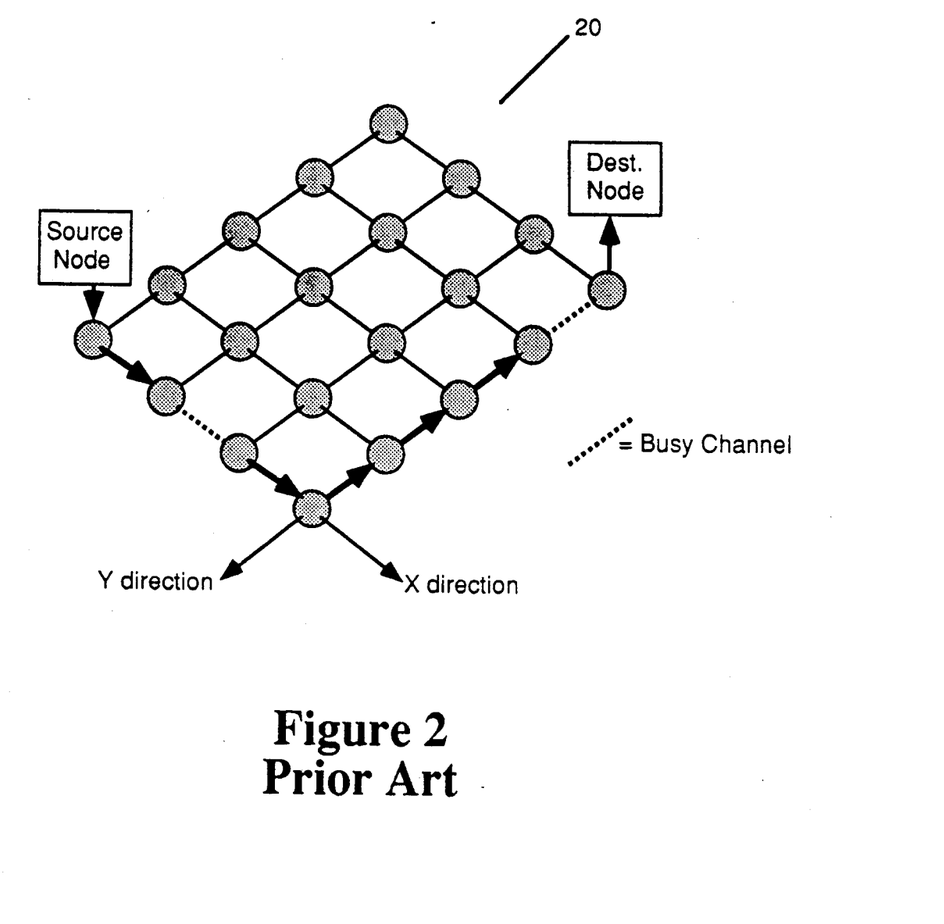
FIG. 2 is an illustration of a two-dimensional prior art network architecture.

In the preferred embodiment of the present invention, a first multi-dimensional routing network (A) comprising a plurality of processing nodes is provided. Referring to FIG. 1, Node 10, as configured for network A, is illustrated. FIG. 2 illustrates a typical arrangement of these nodes in network A. Each node of network A comprises a processing means 11 for processing information and a router means or router 12 for routing information (i.e. messages) between nodes in the network. Messages are routed in the network of FIG. 2 using either a complete addressing method or an incomplete addressing method. Using incomplete addressing, the destination node for the message is defined in terms of an X, Y displacement from the current node through which the message is being routed. The portion of the destination displacement for a particular dimension is stripped from the message as routing in that dimension is completed. Using complete addressing, the absolute address (or relative address) in each dimension of the destination node is maintained for the message as it is routed through to the destination node. The structure of the nodes and network of FIGS. 1 and 2 and methods for passing messages between nodes using complete and incomplete addressing are concepts well known to those of ordinary skill in the art.

Figure 3:
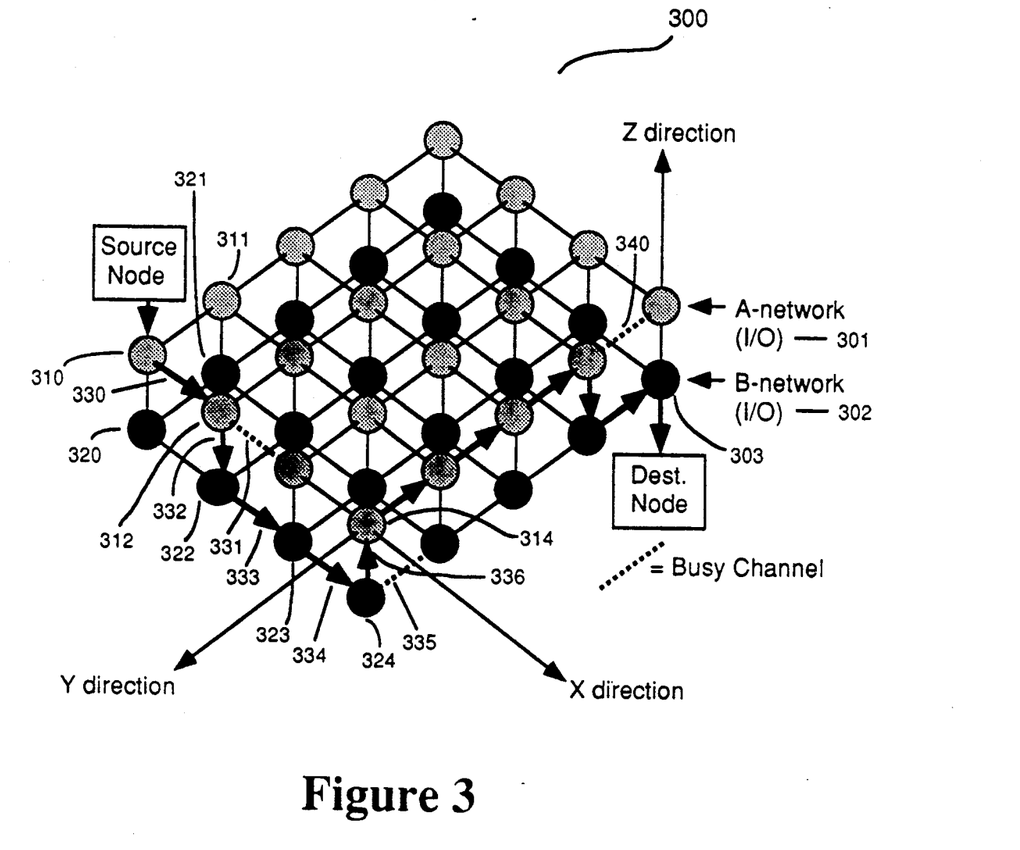
FIG. 3 is an illustration of the two-dimensional dual mesh network architecture of the preferred embodiment.

In order to improve the efficiency of the message passing arrangement of network A shown in FIGS. 1 and 2, the present invention provides second multi-dimensional routing network, denoted B. Network B is an identical or redundant message passing multi-dimensional network of routers connected to network A as shown in FIG. 3. Network B is arranged in a topology and dimension equal to that of network A. In the preferred embodiment of the present invention, the first network A and the second network B are arranged in a two-dimensional dual mesh connection of nodes having an X dimension and a Y dimension. Each router of the combined network 300 has an associated X coordinate and Y coordinate in its respective network. Each node of both network A and network B includes a router having X channels for routing messages in an X direction and Y channels for routing messages in a Y direction. Within the A network, routers are connected to each other via channels (first network channels) for the X and Y direction. Similarly, within the B network, routers are also connected to each other via channels (second network channels) in the X and Y direction. The router at particular coordinates in network A is connected to the router at the corresponding coordinates in network B via channels denoted Z channels.

Referring to FIG. 3, the dual mesh network arrangement 300 of the preferred embodiment is illustrated. Network A 301 and network B 302 are arranged and connected together as shown. For example, node 310 is shown to be connected to an adjacent node 311 via a Y channel and connected to node 312 via an X channel all within network A. In addition, node 310 is also connected to router 320 in network B 302 via a Z channel.

Figure 4:
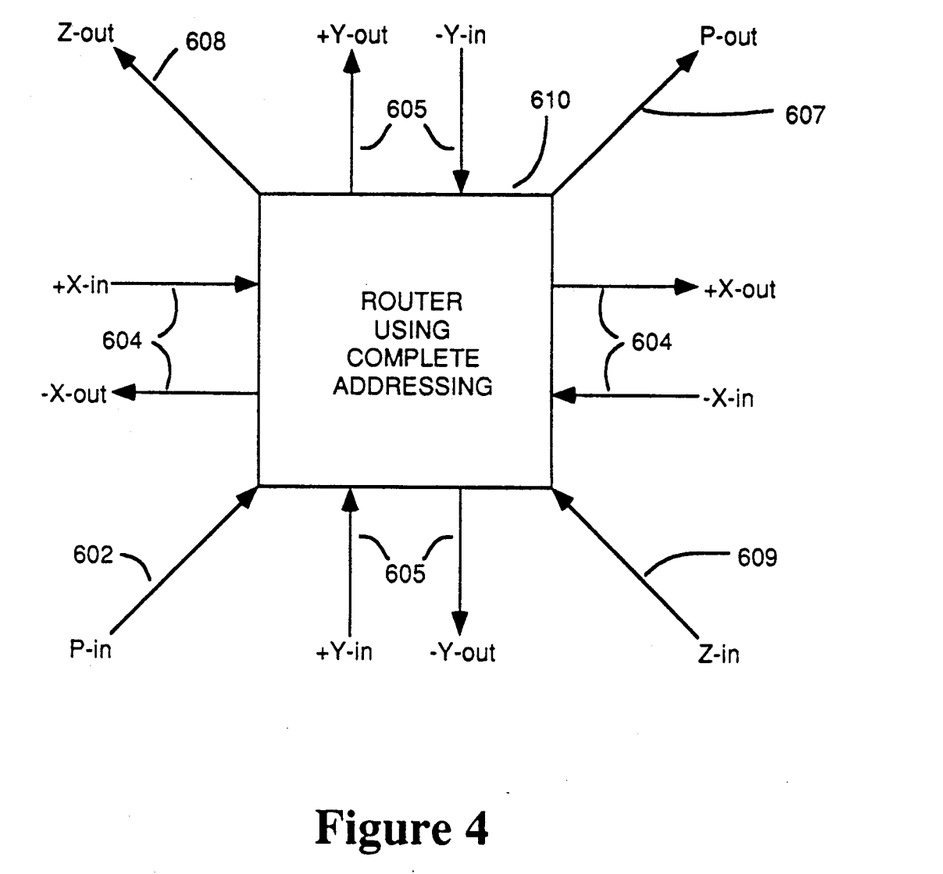
FIG. 4 is an illustration of the router of the present invention using complete addressing.

In the preferred embodiment of the present invention, each router of both the A and B networks comprises four types of channels for communicating information. These router channels are illustrated in FIG. 4 for a network system using complete addressing and in FIG. 5 for a network using incomplete addressing. Referring to FIG. 4, a first channel (P-in and P-out) is used to transfer information between a router and a processor means coupled to the router. This first channel is also used to connect a router in the A network to its corresponding router in the B network. A second channel ($\pm$X-in and $\pm$X-out) is used to transfer information between routers in an X direction. A third channel ($\pm$Y-in and $\pm$Y-out) is used to transfer information between routers in a Y direction. A fourth channel (Z-in and Z-out) is used to transfer information between routers in a Z direction.

If complete node addressing is used as shown in FIG. 4, each router has an input (Z-in) channel and an output (Z-out) channel that connects with the redundant B network. Complete information defining the extent of routing performed thus far in one network is carried to the redundant network via information contained in the message header. The information defining the extent of routing may take the form of an absolute destination node address or a relative destination node address where relative routing information for each dimension is retained. Since complete routing information is carried with the message itself for this form of addressing, a single Z-in channel and Z-out channel can operate properly for all dimensions of the network.

Figure 5:
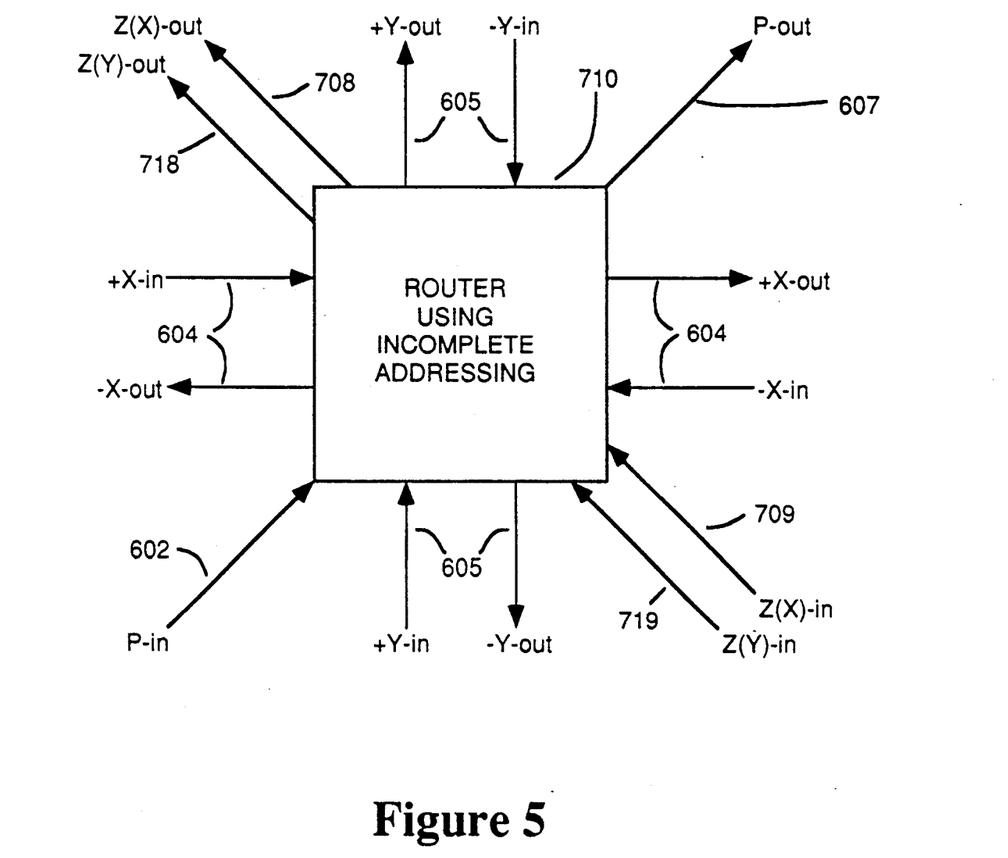
FIG. 5 is an illustration of the router of the present invention using incomplete addressing.

If some forms of relative addressing are used, complete routing information for each dimension may not be carried with the message in the message header. In these types of incomplete addressing systems, the extent of routing information for a particular dimension is stripped off from the message header as soon as routing in that particular dimension is completed. In this case, separate Z channels for each dimension are needed to transfer the extend of routing information between the two redundant networks. In the preferred embodiment, two outgoing (Z[X]-out and Z[Y]-out) and two incoming (Z[X]-in and Z[Y]-in) channels are provided in each router as shown in FIG. 5. The Z[X] channels provide a means for X routing and the Z[Y] channels provide a means for Y routing with the redundant B network.

Figure 6:
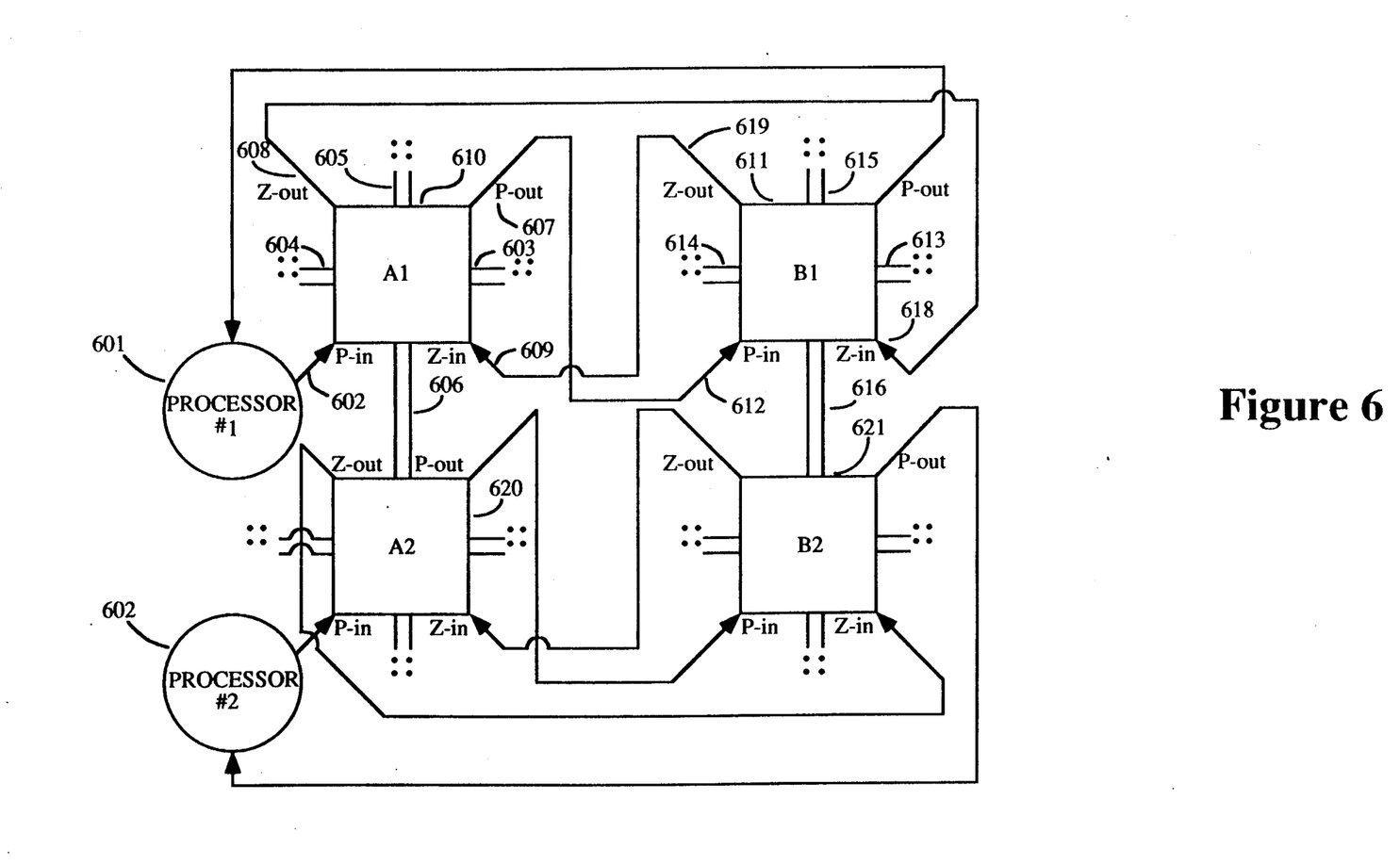
FIG. 6 is an illustration of the channel connections between two nodes of the present invention using complete message addressing.

Referring now to FIG. 6, the channel coupling arrangement is illustrated for two nodes in the network of the present invention where complete addressing is used. A first processor 601 is coupled to a router 610 in the A network and a router 611 in the B network. As shown, the processor acts as a message source or originator by providing messages to router 610 via channel P-in 602. Messages can then be routed in network A using X channels (603, 604) or Y channels (605, 606). Messages can also be routed in network B using X channels (613, 614) or Y channels (615, 616) after the message has been transferred from the Z-out channel 608 of router 610 to the Z-in channel 618 of router 611. If an X or Y channel is unavailable in the A network, the message can be routed to the B network in the Z dimension using the Z-out channel 608. Thus, the message may be routed from the Z-out channel 608 of router 610 to the Z-in channel 618 of router 611. Similarly, if an X or Y channel is unavailable in the B network, the message can be routed to the A network in the Z dimension using the Z-out channel 619 of router 611. In this way, the message may be routed from the Z-out channel 619 of router 611 to the Z-in channel 609 of router 610. A message may not, however be routed back on a Z channel if the previous channel traversed was a Z channel. Thus, if a message is routed to the redundant network via a Z channel because a required X or Y channel was unavailable, the message will be blocked in the redundant network router if the required channel in the redundant network is also unavailable.

When a message reaches its destination node, the message is routed to the destination processor over the P-out channel. In the configuration depicted in FIG. 6, if a message reaches its destination node in the A network, the message is routed to the B network via P-out port 607. The B network router 611 receives the message on the P-in port 612 and then routes the message to processor 601 via the P-out port 630.

In an alternative embodiment, the P-out ports of both routers 610 and 611 may be connected directly to the processor 601. In this manner, the message may be routed directly to the destination processor without having to traverse to the alternate network.

Figure 7:
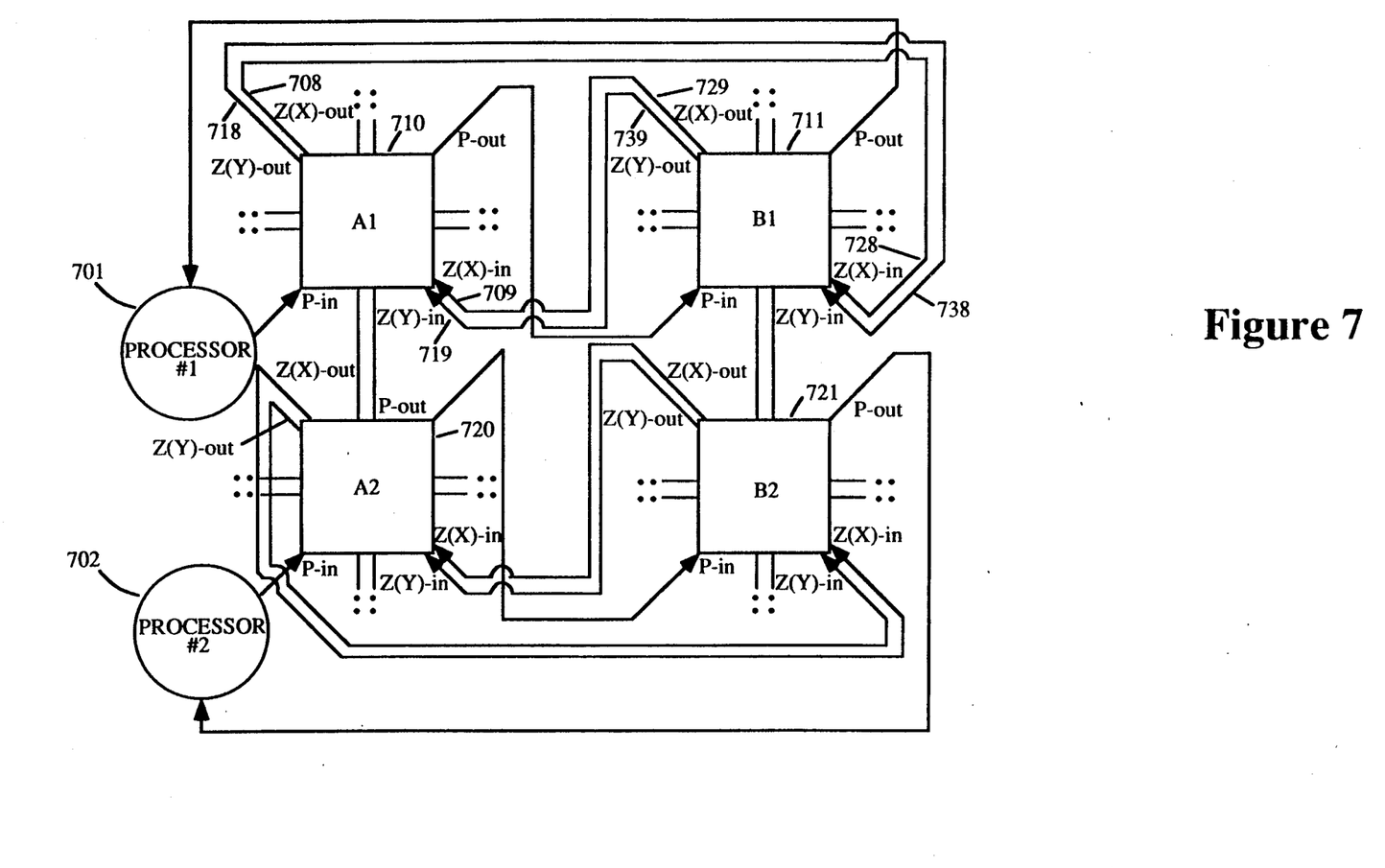
FIG. 7 is an illustration of the channel connections between two nodes of the present invention using incomplete message addressing.

In another alternative embodiment using incomplete addressing, dual Z channels are required for transferring messages between A and B networks in the Z direction. The channel coupling arrangement for this alternative embodiment is illustrated in FIG. 7. As shown in FIG. 7, the channel coupling arrangement is similar to the arrangement shown in FIG. 6, except that a Z[X] channel (708 and 709) and a Z[Y] channel (718 and 719) is provided in router 710 for transferring messages between the A and B networks in both directions using incomplete addressing. In yet another embodiment using incomplete addressing, the P-in/P-out ports of each router can be used to share routing of a message between the redundant networks. In this embodiment, a portion of the routing of a message could be performed in one network. The message then transitions to the alternate network via the P-in/P-out ports. The message then continues to its destination on the alternate network.

This channel arrangement and node connectivity as shown in the preferred embodiments of FIGS. 6 and 7 allows messages to pass between network A and network B through the routers. Routers use routing information (i.e. a routing address header) contained in each message for the purpose of setting up a path between the source node and the destination node for the message. In order to prevent deadlock, messages are routed in networks A and B by routing first in the X dimension and then in the Y dimension. Deadlock is an error condition caused when two nodes are waiting for a channel reserved by the other node. By routing first in the X direction then in the Y direction, the path between any two nodes in the X and Y-dimensions is unique. The path between the source and destination node is thus defined as the set of required channels necessary to route a message from the source node to destination node first in the X direction and then in the Y direction. When contention is encountered for a required channel in the X or Y direction, a transition between the A and B networks can be made if the corresponding Z channel is available. Therefore, routing information contained in the header of the message being routed is used only for purposes of defining the unique route in the X and Y dimensions. Message routing information does not need to contain Z dimension routing information. Thus, the redundant B network can be added to an existing A network without the need to modify the existing routing information stored for each message. Routing in the Z dimension is variable, adaptive, and dependent on the congestion encountered in the A and/or B networks.

Some prior art networks use a form of relative addressing for message routing where a portion of the routing information is stripped off when routing in a particular direction is finished. For these incomplete message addressing systems, problems are encountered when messages are allowed to transit across a single Z channel without complete relative routing information. This is because complete X and Y displacement information must be part of the message when it makes the transition from one network to the other. A router in the alternate network may not be able to distinguish a partial relative address header from a complete address header.

Other networks use an absolute addressing capability. Instead of sending X and Y displacements with the message in the address header, the absolute address of the destination node is sent with the message. When a router receives a message, the router compares the destination node address in the message to the router's own address. Based on this comparison, the router determines which port (channel) to use when transmitting the message to the next router in line. Absolute addressing, therefore creates the requirements that each router be aware of its address within the network. This is not the case with relative addressing.

The address format when absolute addressing is used is of the following form: (X, Y) when the network is two-dimensional and (X, Y, Z) when the network is three-dimensional. X and Y correspond to the cartesian coordinates that locate the node within the addressable-routing network.

Upon reception of a message, the router must compare its internally stored absolute address with the absolute address accompanying the message. If the addresses are the same, the message exits out the P-out port of the router to the node processor. If the addresses do not match, the difference between the X and Y coordinates is calculated respectively. The sign of the result of each calculation is used to determine which channel of the router to exit.

For a first example, if the node's absolute address is (4, 6) and the address arriving with the message is (2, 8), the difference between the coordinates is calculated as follows: $2-4=-2$ for the X coordinates and $8-6=+2$ for the Y coordinates. These results indicate that the message must be routed in the $-X$ direction, since all X routing must be performed prior to Y routing. In this case, the difference between the X coordinates is non-zero.

For a second example, if the node's absolute address is once again (4, 6) and the address arriving with the message is (4, 8), the calculated difference equals (0, 2). This indicates that the message must be routed in the $+Y$ direction, since the X result is zero. In a system using complete addressing, the address sent with the message is not stripped or modified by the routers during routing.

Referring again to FIG. 3, an example of the message routing method of the present invention is shown. Node 310 is chosen as an arbitrary source node from which a message is originated. Node 303 is arbitrarily chosen as a destination node where message routing terminates. Initially, the message is routed in the X direction along path 330 to node 312. The message will continue to move to an adjacent node in the X direction as long as paths are available. Once the message reaches an X coordinate equal to that of the destination node, the message begins to move in the Y direction until the destination is reached. When the destination router is reached, the message is routed out of the P-out channel of the router and received by the processor of the destination node.

If, however, an X, Y channel is not immediately granted when requested by a router (i.e. the channel is busy servicing another request, or the path is malfunctioning), a request is made for the corresponding Z channel. Both the X or Y channel request and the Z channel request is maintained until one request is granted. The router does not commit to routing on a particular channel until a channel request is granted. The message is then routed on the granted channel and the other channel request is withdrawn.

Referring again to FIG. 3, X channel 331 from node 312 is busy, and thus prevents the message from being routed to node 313. In prior art networks, the message would be blocked until path 331 was available. In the present invention, however, the router for node 312 makes a request for X channel 331 followed by a request for Z channel 332. If the Z channel is available, as is the case for the example in FIG. 3, the message is routed in the Z direction along path 332 to the B network router 322. The request for X channel 331 is withdrawn. Notably, the normal routing address header contained in the message is not altered by the transition through the Z dimension. Thus, the message is able to continue its journey to the destination node, while message routing in the prior art network would be stalled at node 312.

Having been routed to the B network, the message continues to be routed in the X direction as if the message was still being routed in the A network. The routing address header continues to supply the X and Y dimension routing information. The message is routed in the X direction until the message reaches the X coordinate corresponding to the destination node. In the example of FIG. 3, node 324 is located at the same X coordinate as destination node 303. Thus, once the message reaches node 324, X routing terminates and Y routing beings. If a message is received by a router on the Z channel only to find that the required redundant X or Y channel is busy, the message is blocked and must wait for the required X or Y channel. In this case, the message cannot be routed back on the Z channel.

As shown in FIG. 3, the message encounters a busy Y channel 335 leading out from node 324. In this case, a request for the Z channel 336 leading from node 324 is made while a request for the Y channel 335 is still pending. When either the Y channel request or the Z channel request is granted, the message continues on the granted channel. In FIG. 3, Z channel 336 is shown to be granted first. In this case, the Y channel 335 request is withdrawn and the message is routed to node 314 in network A. Again, the message is routed toward the destination node in the Y direction. If the message encounters another busy Y channel (i.e. path 340), the message may again be routed in the Z direction until the destination router is finally reached. When the routing address matches the destination node address or the relative dimensional displacements are zero, the message exits the P-out port of the destination router and is received by the destination processor.

ROUTING LOGIC OF THE PREFERRED EMBODIMENT

Figure 8:
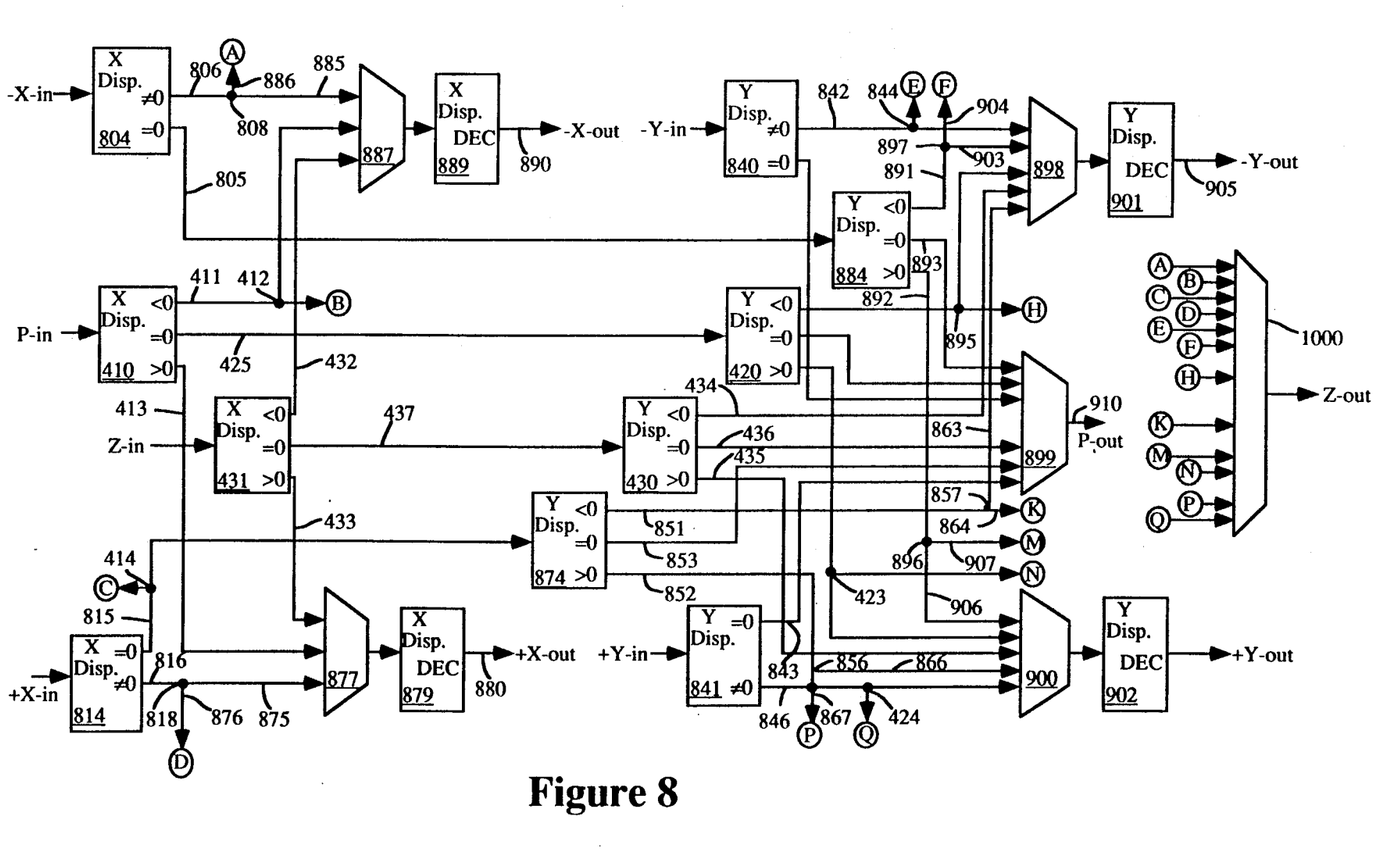
FIG. 8 illustrates routing logic for a two dimensional router using complete addressing with relative displacement.
Figure 9:
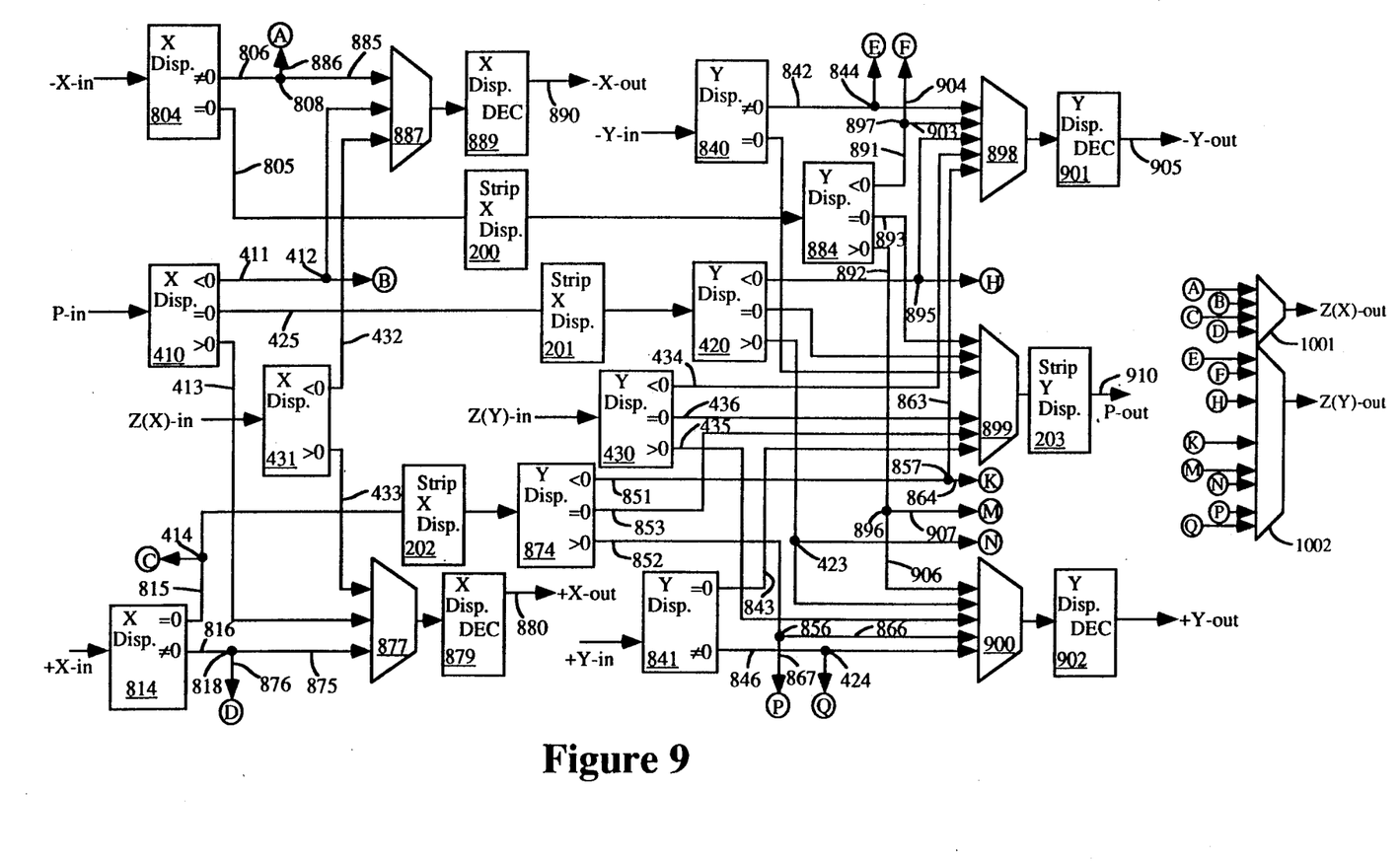
FIG. 9 illustrates routing logic for a two dimensional router using incomplete addressing with relative displacement.
Figure 10:
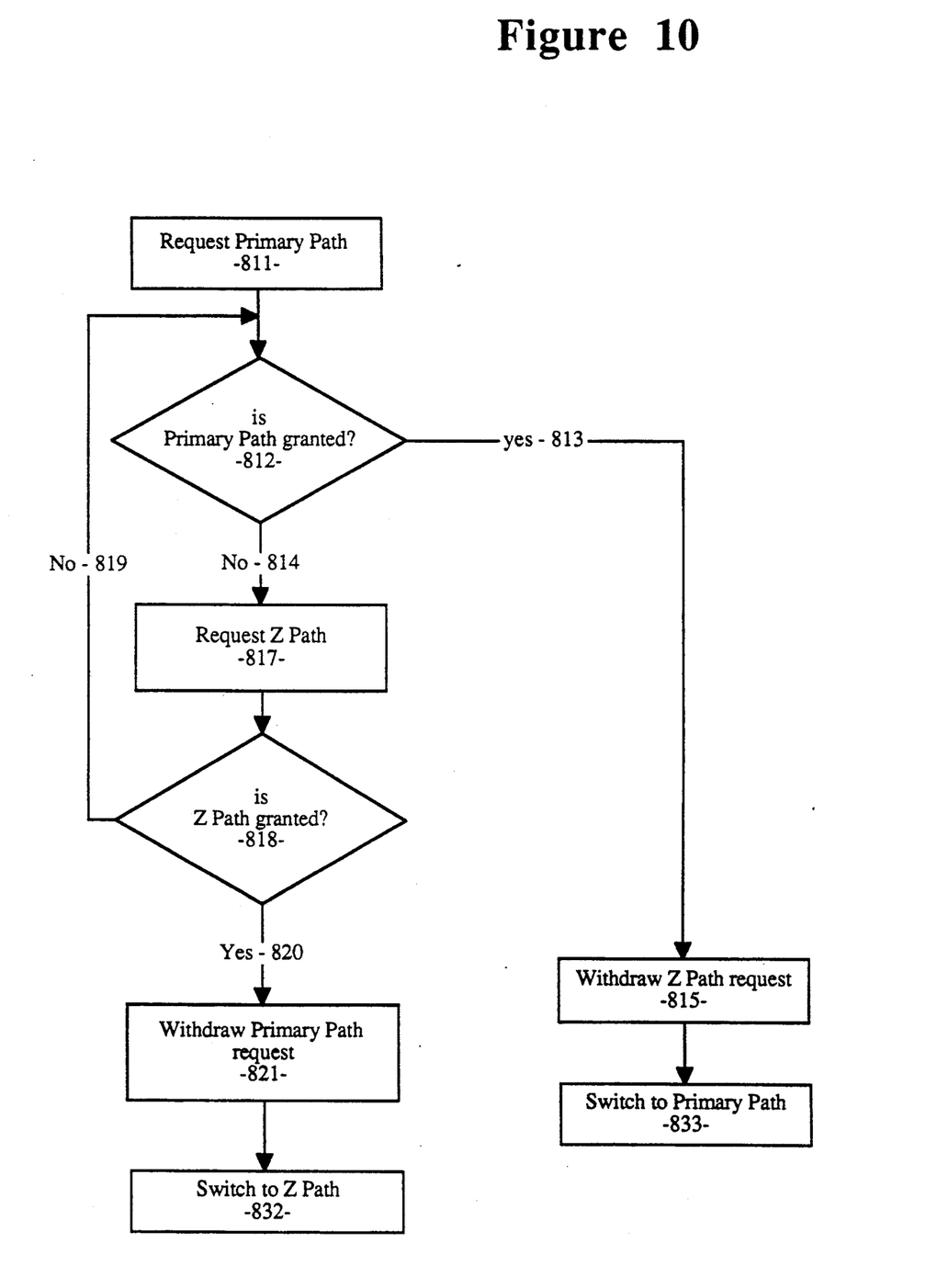
FIG. 10 illustrates the function of the arbitration logic used to control the flow of messages into multiplexers in each of the embodiments shown in FIGS. 8 and 9.

The routing logic of the adaptive routers of the present invention is implemented using a routing automata. These automata are hardware elements including switching, decrementing, and decision making elements. FIGS. 8 and 9 illustrate this routing automata as it operates on messages flowing through the routers. FIG. 8 illustrates routing logic for a two dimensional router using complete addressing with relative displacement. FIG. 9 illustrates routing logic for a two dimensional router using incomplete addressing with relative displacement. FIG. 10 illustrates the function of the arbitration logic used to control the flow of messages at junction points as the messages move into multiplexers as shown in each of the embodiments shown in FIGS. 8 and 9.

Referring to FIG. 8, the routing logic for a two dimensional router using complete addressing with relative displacement is illustrated. In each of the two embodiments shown in FIG. 8 and 9 and described below, routers receive messages on each of six input channels: −X-in, +X-in, −Y-in, +Y-in, P-in, and Z-in (for the incomplete addressing embodiment of FIG. 9, the Z input is Z(X)-in and Z(Y)-in). Routing on each of these channels may occur in parallel. For each message in these two-dimensional embodiments, the relative displacement of the message from its destination is carried by the message in two portions: a first portion (X disp.) represents the displacement in the X direction, and a second portion (Y disp.) represents the displacement in the Y direction.

For a message received on the −X-in channel shown in FIG. 8, the X displacement is compared with zero (decision component 804). If the X displacement is zero (path 805), no movement in the X direction is required for this message. In this case, the message moves to the decision component 884 illustrated in FIG. 8. Decision component 884 handles message movement in the Y direction. For absolute addressing network systems or other types of complete relative addressing systems, the routing address header is not modified during this movement.

Referring again to FIG. 8, the message moves to arbitration junction 808 if the X displacement is non-zero (path 806). Arbitration junction 808 is the first example of the arbitration process used throughout the design shown in FIGS. 8 and 9. At each arbitration junction in the two embodiments, similar arbitration steps are performed. For clarity, the hardward implementing the arbitration process is not shown in FIGS. 8 and 9. The function of the arbitration process is to gain access to an available channel. Each arbitration junction has an input path (path 806 in this first case), and two output paths (path 885 and path 886 in this case). One output path is designated as the primary path (path 885), the other output path is designated as the secondary output path (path 886). The steps performed at each arbitration junction are illustrated in FIG. 10.

Referring now to FIG. 10, the arbitration steps performed at each of the arbitration junctions is illustrated. First, the primary path is requested (step 811). Methods for requesting a particular channel are well known in the art. If the request for the primary path is not granted (path 814), the primary path may be busy, malfunctioning, or unavailable for some other reason. In this case, the Z path is requested (step 817) to transfer the message to the redundant network. Without the present invention, the message would be stalled waiting for the busy primary path to become available. If the Z path request is also not granted (path 819), the message is stalled at the arbitration junction until one of the requested channels are granted. This stalled state is illustrated in FIG. 10 by path 819 leading back to step 812 where the availability of the primary path is tested. At this point in the arbitration process, two channel requests are pending; the primary path and the Z path. The message continues to be stalled at the arbitration junction as long as both the primary and Z paths are busy. Notably, the message does not commit to taking either the primary path or the Z path until one these channels becomes available.

If the primary path becomes available first, path 813 is taken to step 815. At step 815, the Z path request is withdrawn. Next, the multiplexer coupled to the primary path is switched to the primary path (step 833) and message is routed along the primary path.

Referring back to step 818 of FIG. 10, path 820 is taken to step 821, if the Z path becomes available before the primary path. At step 821, the pending primary path request is withdrawn. Next, the multiplexer coupled to the Z path is switched to the Z path (step 832) and message is routed along the Z path. Each time an arbitration junction is encountered in the design of the two embodiments in FIGS. 8 and 9, process steps similar to the arbitration process described above are performed.

Referring back now to FIG. 8 at arbitration junction 808, the arbitration for the primary path 885 or Z path 886 is performed. If the primary path 885 is obtained, routing continues in the X direction to the multiplexer 887 and on to decrementing component 889. Decrementing component 889 decrements the X displacement of the message address thereby indicating that routing through this router has been completed. The message then exits the router out the —X-out port on path 890.

If the primary path 885 cannot be obtained, but the Z channel can be obtained (path 886), routing continues to the bubble labeled A in FIG. 8. The bubble A logically connects path 886 to an input of multiplexer 1000 where routing out the Z-out channel is accomplished.

Referring back to decision component 804, path 805 is taken if the X displacement is equal to zero. In this case, the message travels on path 805 to decision component 884. Decision component 884 handles message movement in the Y direction. At decision component 884, the Y displacement of the message is compared with zero. If the Y displacement is less than zero (path 891), the message is routed to arbitration junction 897 on path 891. If a primary path is available (path 903), the message is routed to multiplexer 898 then to decrementing component 901. Decrementing component 901 decrements the Y displacement of the message address thereby indicating that routing through this router has been completed. The message then exits the router out the —Y-out port on path 905.

If at arbitration junction 897, the primary path 903 cannot be obtained, but the Z channel can be obtained (path 904), routing continues to the bubble labeled F in FIG. 8. The bubble F connects path 904 to an input of multiplexer 1000 where routing out the Z-out channel is accomplished.

Referring again to decision component 884, if the Y displacement of the message is greater than zero (path 892), the message is routed to arbitration junction 896 on path 892. If a primary path is available (path 906), the message is routed to multiplexer 900 then to decrementing component 902. Decrementing component 902 decrements the Y displacement of the message address thereby indicating that routing through this router has been completed. The message then exits the router out the +Y-out port on path 902.

If at arbitration junction 896, the primary path 906 cannot be obtained, but the Z channel can be obtained (path 907), routing continues to the bubble labeled M in FIG. 8. The bubble M connects path 907 to an input of multiplexer 1000 where routing out the Z-out channel is accomplished.

Referring again to decision component 884, if the Y displacement of the message is equal to zero (path 893), the message is routed to multiplexer 899. The message then exits the network out the P-out port on path 910, since routing in both X and Y dimensions has been completed.

For a message received on the +X-in channel shown in FIG. 8, processing occurs similar to that described for the —X-in channel. First, the X displacement is compared with zero (decision component 814). If the X displacement is zero (path 815), no movement in the X direction is required for this message. In this case, the message moves to the decision component 874. Decision component 874 handles message movement in the Y direction; this component is described in detail below. For absolute addressing network systems or other types of complete relative addressing systems, the routing address header is not modified.

Referring again to FIG. 8 at decision component 814, the message moves to arbitration junction 818 if the X displacement is non-zero (path 816). Arbitration junction 818 is another example of the arbitration process used throughout the design of the present invention. The steps performed at arbitration junction 818 are similar to those performed at arbitration junction 808 described above and illustrated in FIG. 10.

Referring still to FIG. 8 at arbitration junction 818, the arbitration for the primary path 875 or Z path 876 is performed. If the primary path 875 is obtained, routing continues in the X direction to the multiplexer 877 and on to decrementing component 879. Decrementing component 879 decrements the X displacement of the message address thereby indicating that routing through this router has been completed. The message then exits the router out the +X-out port on path 880.

If the primary path 875 cannot be obtained, but the Z channel can be obtained (path 876), routing continues to the bubble labeled D in FIG. 8. The bubble D connects path 876 to an input of multiplexer 1000 where routing out the Z-out channel is accomplished.

Referring back to decision component 814, path 815 is taken if the X displacement is equal to zero. In this case, path 815 routes the message to decision component 874. Decision component 874 handles message movement in the Y direction. At decision component 874, the Y displacement of the message is compared with zero. If the Y displacement is less than zero (path 851), the message is routed to arbitration junction 857 on path 851. If a primary path is available (path 863), the message is routed to multiplexer 898 then to decrementing component 901. Decrementing component 901 decrements the Y displacement of the message address thereby indicating that routing through this router has been completed. The message then exits the router out the −Y-out port on path 905.

If at arbitration junction 857, the primary path 863 cannot be obtained, but the Z channel can be obtained (path 864), routing continues to the bubble labeled K in FIG. 8. The bubble K connects path 864 to an input of multiplexer 1000 where routing out the Z-out channel is accomplished.

Referring again to decision component 874, if the Y displacement of the message is greater than zero (path 852), the message is routed to arbitration junction 856 on path 852. If a primary path is available (path 866), the message is routed to multiplexer 900 then to decrementing component 902. Decrementing component 902 decrements the Y displacement of the message address thereby indicating that routing through this router has been completed. The message then exits the router out the +Y-out port.

If at arbitration junction 856, the primary path 866 cannot be obtained, but the Z channel can be obtained (path 867), routing continues to the bubble labeled P in FIG. 8. The bubble P connects path 867 to an input of multiplexer 1000 where routing out the Z-out channel is accomplished.

Referring again to decision component 874, if the Y displacement of the message is equal to zero (path 853), the message is routed to multiplexer 899. The message then exits the network out the P-out port on path 910, since routing in both X and Y dimensions has been completed.

Thus, message routing by a router receiving message input on −X and +X channels is described. Routing a message received on the −Y and +Y channels is performed in a similar manner to that described above for X channels. The main difference is that routing in the Y dimension implies that X dimension routing has already been completed. Thus, Y routing begins as illustrated in the middle of FIG. 8 with the decision components 840 (−Y-in) and 841 (+Y-in). Similar to X routing, the Y displacement is compared with zero in decision components 840 (−Y-in) and 841 (+Y-in). If the Y displacement is not equal to zero (paths 842 and 846) and a Y-out channel is available, the message is routed to a Y-out channel through multiplexers 898 or 900. If the Y displacement is not equal to zero (paths 842 and 846) and a Yout channel is not available, the message is routed to a Z-out channel via bubbles E and Q and multiplexer 1000.

Referring back to decision components 840 (−Y-in) and 841 (+Y-in), if the Y displacement is equal to zero (paths 847 and 843), message routing in the X and Y dimension has been completed. Thus, the message is routed to the destination processor via the multiplexer 899 and the P-out channel 910, if the P-out channel is available.

A processor originating a message puts the message into the network system by sending the message to its router via the P-in channel. The P-in channel may also be used to complete the path between the P-out channel of one network and P-out channel of the redundant network if only one network is directly P-out coupled to the destination processor. For messages received by a router on the P-in channel, decision component 410 is used to initially test the X displacement. If the X displacement of the message is less than zero (path 411), the message is routed in the −X direction via arbitration junction 412, multiplexer 887, and decrementer component 889. The message travels to the redundant network via the bubble labeled B and multiplexer 1000 if the primary channel of arbitration junction 412 is unavailable. If the X displacement of the message is greater than zero (path 413), the message is routed in the +X direction via arbitration junction 414, multiplexer 877, and decrementer component 879. The message travels to the redundant network via the bubble labeled C and multiplexer 1000 if the primary channel of arbitration junction 414 is unavailable. If the X displacement of the message is equal to zero (path 425), no X dimension routing is required; thus, the message is routed to decision component 420 where the Y displacement is tested.

At decision component 420, the Y displacement of the message is compared with zero. If the Y displacement is less than zero, the message is routed to arbitration junction 895. If a primary path is available, the message is routed to multiplexer 898 then to decrementing component 901. Decrementing component 901 decrements the Y displacement of the message address thereby indicating that routing through this router has been completed. The message then exits the router out the −Y-out port on path 905.

If at arbitration junction 895, the primary path cannot be obtained, but the Z channel can be obtained, routing continues to the bubble labeled H in FIG. 8. The bubble H connects the path to an input of multiplexer 1000 where routing out the Z-out channel is accomplished.

Referring again to decision component 420, if the Y displacement of the message is greater than zero and the Y channel is available, the message is routed to multiplexer 900 then to decrementing component 902 and finally out the +Y-out channel. If the Y displacement of the message is greater than zero and the Y channel is not available, but the Z channel can be obtained, routing continues to the bubble labeled N in FIG. 8. The bubble N connects the path to an input of multiplexer 1000 where routing out the Z-out channel is accomplished.

Referring again to decision component 420, if the Y displacement of the message is equal to zero, the message is routed to multiplexer 899. The message then exits the network out the P-out port on path 910, since routing in both X and Y dimensions has been completed.

Finally, routing for a message received by a router on the Z-in channel is illustrated in FIG. 8. The X displacement of a message received on the Z-in channel is tested with zero at decision component 431. If the X displacement of the message is less than zero (path 432), the message is routed in the −X direction via multiplexer 887 and decrementer component 889. If the X displacement of the message is greater than zero (path 433), the message is routed in the +X direction via multiplexer 877 and decrementer component 879. If the X displacement of the message is equal to zero (path 437), no X dimension routing is required; thus, the message is routed to decision component 430 where the Y displacement is tested.

At decision component 430, the Y displacement of the message is compared with zero. If the Y displacement is less than zero (path 434), the message is routed to multiplexer 898 then to decrementing component 901. Decrementing component 901 decrements the Y displacement of the message address thereby indicating that routing through this router has been completed. The message then exits the router out the −Y-out port on path 905.

Referring again to decision component 430, if the Y displacement of the message is greater than zero (path 435), the message is routed to multiplexer 900 then to decrementing component 902 and finally out the +Y-out channel. Referring again to decision component 430, if the Y displacement of the message is equal to zero, the message is routed to multiplexer 899. The message then exits the network out the P-out port on path 910, since routing in both X and Y dimensions has been completed.

Thus, message routing logic of the complete addressing embodiment of the present invention illustrated in FIG. 8 is described. Referring now to FIG. 9, an alternative embodiment is shown for a routing system using incomplete addressing. Note that the architecture is very similar except for the addition of stripping components 200-203 and the substitution of multiplexer 1000 for the two multiplexers 1001 and 1002. Also illustrated in FIG. 9, messages are received by routers on two Z channels (Z(X), and Z(Y)) instead of the single Z-in channel of the complete addressing embodiment.

In the incomplete addressing case of FIG. 9, decision component 431 now receives the Z(X)-in input and decision component 430 receives the Z(Y)-in input. Stripping components 200-202 are provided to strip the X displacement of the message routing address after routing in the X direction has been completed. Stripping component 203 is provided to strip the Y displacement of the message routing address after routing in the Y direction has been completed. Multiplexer 1000 is now split into two separate multiplexers. The first multiplexer 1001 collects input for the Z(X)-out channel. The second multiplexer 1002 collects input for the Z(Y)-out channel.

Thus, an adaptive routing means and method useful for transferring messages in a multi-dimensional network is disclosed.

Although this invention has been shown in relation to a particular embodiment, it should not be considered so limited. Rather, it is limited only by the appended claims.

What is claimed is:

1. A network for routing messages comprising:
   a first network having a plurality of nodes, each said node having a router, said nodes being coupled together by first network channels for routing messages between nodes of said first network;
   a second network having a plurality of nodes, each said node having a router, said nodes being coupled together by second network channels for routing messages between nodes of said second network, each said router in said second network being coupled to at least one router in said first network by Z channels for routing messages between nodes of each network, said first and said second networks being of equal dimension; and
   message routing means operably disposed within each said router of both said first network and said second network, said message routing means routing messages from a source node to a destination node via said first network channels and said second network channels, said message routing means routing messages between said first network and said second network on said Z channels if a required first network channel or a required second network channel is unavailable.

2. The network claimed in claim 1 wherein said routers use routing information contained in each message for routing said message to its said destination node.

3. The network claimed in claim 1 wherein said first network and said second network are arranged in a two-dimensional dual mesh connection of nodes, said routers of said first network and said second network having X channels for routing messages in an X direction and Y channels for routing messages in a Y direction.

4. The network claimed in claim 1 wherein said message routing means routing messages between said first network and said second network on said Z channels in either direction.

5. The network claimed in claim 1 wherein said message routing means routing messages between said first network and said second network on said Z channels if the previous channel traversed was not a Z channel.

6. The network claimed in claim 1 wherein said message routing means further including:
   means for requesting the use of a primary channel in order to route a message thereon;
   means for determining if a requested channel is available for use;
   means for requesting the use of a secondary channel in order to route said message thereon if said primary channel is unavailable; and
   means for granting the use of a channel in order to route said message thereon, said channel granted being the first of said requested channels to become available.

7. The network claimed in claim 6 further including means for withdrawing a request for the use of a channel when a request for the use of a primary or secondary channel is granted.

8. The network claimed in claim 7 wherein said secondary channel is one of said Z channels.

9. The network claimed in claim 7 wherein said message routing means further including:
   means for repeatedly testing for the availability of both said primary channel and said secondary channel, until either said primary channel or said secondary channel becomes available.

10. The network claimed in claim 1 wherein said messages are routed using relative message addressing.

11. The network claimed in claim 1 wherein said messages are routed using absolute message addressing.

12. In a network having a first network including a plurality of nodes, each said node having a router, said nodes being coupled together by first network channels for routing messages between nodes of said first network and a second network including a plurality of nodes, each said node having a router, said nodes being coupled together by second network channels for routing messages between nodes of said second network, each said router in said second network being coupled to at least one router in said first network by Z channels for routing messages between nodes of each network, said first and said second networks being of equal dimension, a process for routing messages comprising the step of:
   routing messages from a source node to a destination node via said first network channels and said second network channels, said messages being routed between said first network and said second network on said Z channels if a required first network channel or a required second network channel is unavailable.

13. The process claimed in claim 12 wherein said message routing step further including:
   requesting the use of a primary channel in order to route a message thereon;
   determining if a requested channel is available for use;
   requesting the use of a secondary channel in order to route said message thereon if said primary channel is unavailable; and
   granting the use of a channel in order to route said message thereon, said channel granted being the first of said requested channels to become available.

14. The process claimed in claim 12 further including a step of:
   decoding routing information contained in each message for routing said message to its said destination node.

15. The process claimed in claim 12 further including a step of:
   routing messages in either an X direction or a Y direction in said first network depending upon information contained in each message.

16. The process claimed in claim 12 wherein messages may be routed on said Z channels from said first network to said second network or from said second network to said first network.

17. The process claimed in claim 13 further including a step of:
   withdrawing a request for the use of a channel when a request for the use of a primary or secondary channel is granted.

18. The process claimed in claim 13 further including a step of:
   repeatedly testing for the availability of both said primary channel and said secondary channel, until either said primary channel or said secondary channel becomes available.

19. A network routing apparatus comprising:
   a primary channel and a secondary channel, said primary channel and said secondary channel being used to route messages in a first network;
   a Z channel, said Z channel being used to route messages to a second network; and
   routing logic coupled to said primary channel, said secondary channel, and said Z channel, said routing logic comprising:
      means for requesting the use of said primary channel in order to route a message thereon;
      means for determining if a requested channel is available for use;
      means for requesting the use of said secondary channel in order to route said message thereon if said primary channel is unavailable; and
      means for granting the use of a channel in order to route said message thereon, said channel granted being the first of said requested channels to become available.

20. The network routing apparatus claimed in claim 19 further including:
   means for decoding routing information contained in each message for routing said message to a destination node.

21. The network routing apparatus claimed in claim 19 further including:
   means for routing messages in either an X direction or a Y direction in said first network depending upon information contained in each message.

22. The network routing apparatus claimed in claim 19 wherein messages may be routed on said Z channel from said first network to said second network or from said second network to said first network.

23. The network routing apparatus claimed in claim 19 wherein said routing logic further comprises means for withdrawing a request for the use of a channel when a request for the use of a primary or secondary channel is granted.

24. The network routing apparatus claimed in claim 19 wherein said routing logic further comprises means for repeatedly testing for the availability of both said primary channel and said secondary channel, until either said primary channel or said secondary channel becomes available.

* * * * *